April 11, 1944. W. L. LYON ET AL 2,346,224
SELF-CLOSING VALVE FOR DUAL DIRECTIONAL FLUID FLOW
Filed June 9, 1942
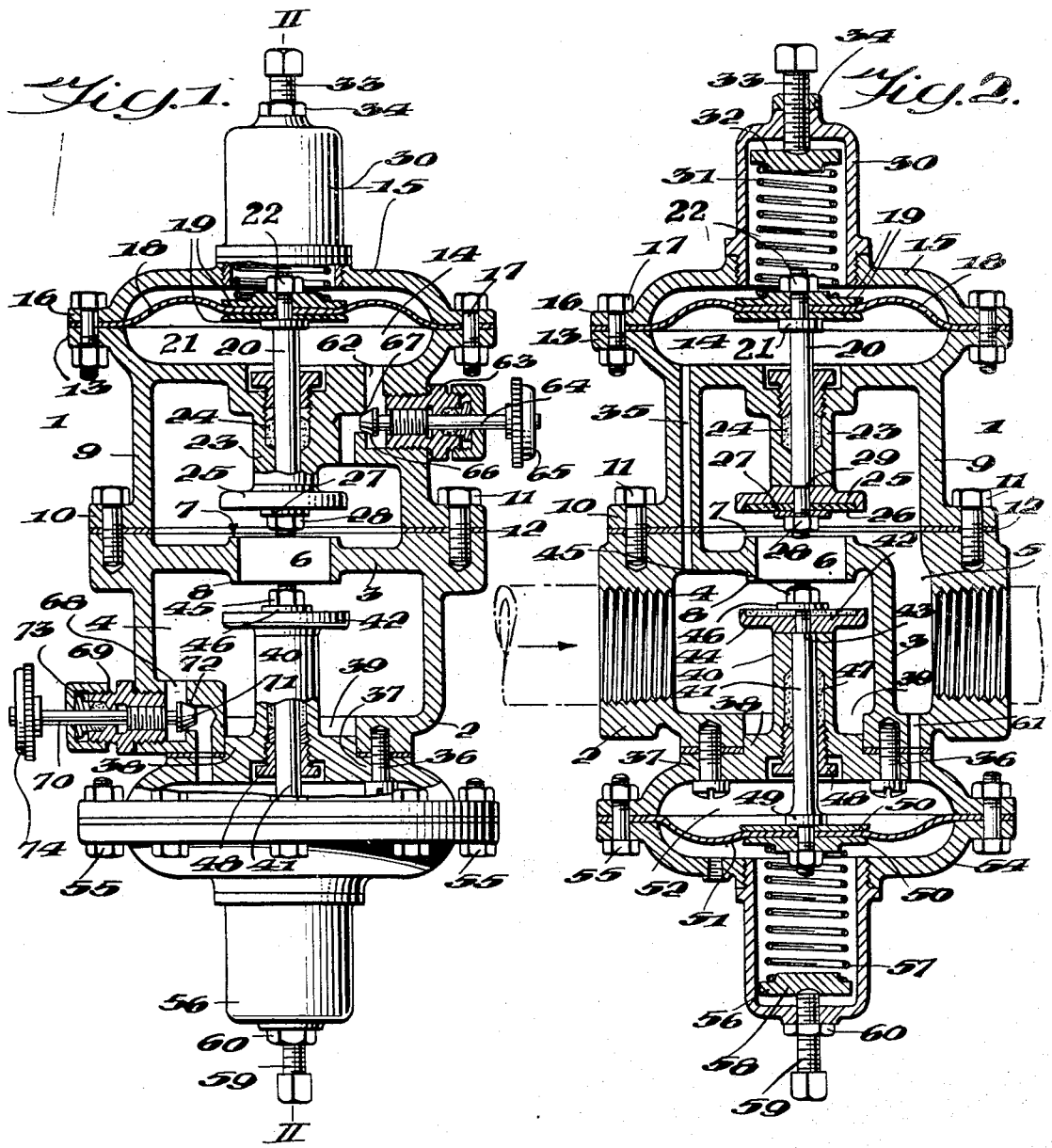
Inventors
Milton E. Lake,
William Lewis Lyon, Patented Apr. 11, 1944

2,346,224

UNITED STATES PATENT OFFICE 2,346,224

SELF-CLOSING VALVE FOR DUAL DIRECTIONAL FLUID FLOW

William Lewis Lyon and Milton E. Lake, South Norwalk, Conn.

Application June 9, 1942, Serial No. 446,393

1 Claim. (Cl. 137—153)

This invention relates to an improvement in flow control valves of the type adapted for use in fluid carrying pipe lines wherein predetermined pressures are maintained, a principal object of the invention being the provision of a valve permitting fluid flow in either normal or reverse directions therethrough and provided with automatically operating means for closing the valve and arresting fluid flow whenever the pressure of the fluid decreases with respect to a given normal range of pressure.

It is another object of the invention to provide an automatic shut-off valve designed to permit the flow of fluid (gas, vapor or liquid) in either positive or negative directions (normal or reverse) through the valve and its associated piping system when the pressures of the fluid handled by the valve are in a normal or predetermined range, the construction of the valve being such as to provide for its automatic closure in the event of cessation of fluid flow therethrough or in the event the fluid pressure on either the upstream or downstream side of the valve should fall below such a normal or predetermined pressure range.

In our companion application, Serial No. 446,392, filed June 9, 1942, there has been disclosed an automatic shut-off valve which operates to arrest fluid flow therethrough when reverse flow of fluid, with respect to normal flow, takes place through the valve. In certain instances, as in the piping of gas through extended municipal mains, it is desirable to provide for such reverse flow and yet to secure the protection afforded by an automatic shut-off valve in the event the mains should become ruptured from any cause and thereby produce diminution in the normal fluid pressures which the associated piping system normally handles, the valve forming the present invention providing an improved self-closing valve structure for this purpose.

For a further understanding of the invention, reference is to be had to the following description and the accompanying drawing, wherein:

Fig. 1 is a vertical sectional view taken through the self-closing valve forming the present invention;

Fig. 2 is a similar view on the plane indicated by the line II—II of Fig. 1.

Referring more particularly to the drawing, the improved valve consists of a casing 1, which is formed to comprise a plurality of separable but united sections, a body section being indicated at 2. This body section comprises a hollow casting having an internal dividing wall 3 which separates the interior of said body section into fluid inlet and outlet chambers 4 and 5, respectively. The end walls of these chambers are provided with threaded openings for the reception of the ends of associated fluid-conducting pipe lines. The chambers 4 and 5 communicate relatively by means of a vertically extending opening 6 formed in the horizontally disposed portion of the wall 3, the ends of said opening being formed to constitute spaced upper and lower valve seats 7 and 8, respectively.

With the valve casing disposed in a horizontally extending pipe line, there is positioned on the top of the body section 2 an upper intermediate casing section 9. The latter has its lower portion outwardly flanged as at 10, said flange being perforated to receive cap screws 11, the threaded shanks of the latter entering tapped openings provided in the body section 2, in order to securely join the casing sections 2 and 9 together. A gasket 12 of compressible material is placed between the adjoining surfaces of the casing sections 2 and 9.

The upper portion of the intermediate casing section 9 is outwardly flanged as at 13 and, further, is shaped to provide the lower half of an upper diaphragm chamber 14. Detachably secured to the flanged portion 13 of the intermediate section 9 is a cap or cover section 15, the latter being provided with an outwardly directed flange 16 which cooperates with the flange 13 to receive fastening bolts or screws 17.

Clamped between the flanges 13 and 16 and disposed within the diaphragm chamber 14 is a flexible upper diaphragm member 18, which is adapted for flexible back and forth movement within the limits of the chamber 14. The center of the diaphragm member 18 has engaged with the opposite surfaces thereof a pair of metallic disks 19. These disks and the diaphragm are provided with centrally disposed registering openings for the reception of the upper end of a top valve rod 20. This rod is formed with a collar 21 on which the lower of the disks 19 rests, while the upper of the disks 19 is engaged by a clamping nut 22 threaded on the upper end of the valve rod 20.

The intermediate section 9 is formed with an axially disposed tubular guide 23 in which the rod 20 is slidably received. If desired, the guide 23 may be provided with a packing 24 to eliminate or minimize fuel leakage around the rod. The lower end of the rod is reduced in diameter for the reception of an upper valve member 25.

This member is preferably in the form of a disk having a recessed lower surface for the reception of a gasket 26 of a compressible material. Engaged with the under surface of the gasket 26 is a metal washer 27 and a clamping nut 28 is threaded on the lower reduced end of the rod 20 to securely hold the valve member 25 in engagement with the annular shoulder 29 of the valve rod and to retain the gasket 26 in its seated position within said upper valve member.

When the upper valve member is moved to a position of valve closure, that is, with the gasket 26 in firm contact with the upper seat 7 of the opening 6, fluid flow through the valve is arrested. To effect such closure of the upper valve member, the cap or cover section 15 of the valve casing is formed with a threaded opening for the reception of the threaded lower end of a spring-receiving cup 30. Within this cup, there is arranged a coil spring 31 of the expansion type. The lower end of this spring has seated engagement with the upper of the disks 19, while the upper end of said spring engages with an adjustable disk 32 slidably positioned in the cup 30. An adjusting screw 33 is threaded in the upper end of the cup 30 and is accessible from the exterior of the casing. The inner end of the screw 33 engages with a depression formed in the upper side of the disk 32. By rotating the screw 33, the disk 32 may be adjusted to control the depression or expansion of the spring 31. A lock nut 34 is carried by the threaded shank of the screw 33 and engages with the top of the cup 30 for maintaining the adjustment of said screw and the tension on the spring 31.

Since the spring 31 exerts its expansive force on the top of the diaphragm member 18, the latter may be flexed within the chamber 14 to permit of sufficient movement of the valve rod 20 to advance the upper valve member 25 into firm seated engagement with the upper valve seat 7. This action takes place when there is insufficient fluid pressure on the under side of the diaphragm 18 to overcome the expansive energy of the spring 31.

Fluid is admitted into the lower part of the diaphragm chamber 14 by means of a restricted passage shown at 35. This passage extends from the fluid inlet chamber 4 to the lower part of the diaphragm chamber 14. In operation, fluid entering the inlet chamber under pressures within a normal or given range, travels through the passageway 35 and into the diaphragm chamber, exerting force on the diaphragm 14 to cause flexure of the latter in opposition to the forces exercised thereon by the spring 31, producing the elevation of the valve member 25 and the consequent establishment of fluid travel from the inlet to the outlet chambers of the valve body. The upper part of the diaphragm chamber 14 is, of course, suitably vented to the atmosphere.

It will be evident that should the pressure of the fluid passing through the valve recede below an established normal pressure range, a condition which may take place as a result of rupture of the pipes line entering or leaving the valve, or from any other cause, the spring 31 will act automatically to cause the valve head 25 to firmly engage with its seat 7, thus arresting the flow of fluid through the valve until the damage has been repaired and normal flow conditions reestablished.

In order to admit of reverse or negative flow of the fluid through the valve and to retain the features of automatic closure in the event of decreased fluid pressures, the under side of the body section 2 has fastened thereto, as at 36, a lower intermediate casing section 37. The section 37 is formed with an annular shouldered portion 38 which is received within an opening 39 provided in the bottom wall of the body section 2. Arising from this shouldered portion is an upstanding tubular guide 40 in which is slidably mounted a lower valve rod 41, the latter being disposed in vertical registration with the rod 20.

Carried by the upper end of the valve rod 41 is a lower valve member 42, which conveniently takes the form of a disk or head seated upon a shoulder 43 formed on the upper end of the rod 41. The upper surface of the valve member is provided with a depression for the reception of a circular gasket 44. The upper end of the valve member 42 is threaded for the reception of a clamping nut 45. This nut, when tightened holds in assembled relation with the valve rod the valve member 42, the gasket 44 and a metallic washer 46. The guide 40, through which the valve rod 41 extends, may be provided with a packing 47 which is retained in sealing contact with the rod 41 by means of an adjustable nut or follower 48.

The lower end of the valve rod 41 is formed with a collar 49 with which engages the upper of a pair of disks 50. These disks are arranged on opposite sides of a lower diaphragm member 51, which is disposed in a lower diaphragm chamber 52, the latter being formed in the section 37 and also in a lower cap or cover section 54, the sections 37 and 54 being detachably secured together by means of bolts 55, which pass through openings provided in the flanged outer edges of said last-named sections. The outer circumferential edge of the diaphragm member 51 is clamped between the casing sections 37 and 51 and the bolts 55 and the nuts carried thereby are suitably tightened.

Depending from the section 54 and having threaded engagement therewith is a lower spring cup 56. Within this cup there is arranged a lower coil spring 57 of the expansion type. The upper end of the spring 57 engages with the lower of the disks 50 while at its lower end the spring 57 is seated on a disk 58, the latter being adjustable by means of a set screw 59, which is held in its adjusted positions by a lock nut 60. By these means, the spring 57 normally advances the lower valve member 42 into seating engagement with the lower valve seat 8. Under normal operation, however, this tendency of the spring 57 is counteracted by the pressure of the fluid passing through the valve. Such pressure is applied to the upper surface of the diaphragm 51 by providing the sections 2 and 37 of the valve casing with a restricted passage 61. This passage extends from the outlet chamber 5 to the upper part of the lower diaphragm chamber 52, whereby when the valve is in normal operation providing for fluid flow therethrough, the pressure of the fluid within the top half of the chamber 52 will counteract the tendency of the spring 57, holding the valve member 42 in its open position as shown.

When the valve closes automatically, the same will remain closed until opened by a definite manual operation. Such opening is accomplished by providing the casing section 9 with a passageway 62. This passageway has a considerably greater diameter throughout its length than the passageway 35.

Threaded into the side of the section 9 is a valve fitting 63. This fitting communicates with the passageway 62 and is internally threaded for the reception of a manually rotatable stem 64. The latter projects through a packing provided in said fitting and has its outer end equipped with a manipulative knob or wheel 65. The inner end of the stem 64 is provided with a conical head 66 which engages normally with a valve seat 67 formed in conjunction with one of the walls of the passageway 62.

A similar manually operated by-pass valve is provided for controlling the flow of fluid through a passageway 68 which leads from the inlet chamber 4 to the upper half of the lower diaphragm chamber 52. This second by-pass valve includes a fitting 69 threaded into the body section 2 in registration with the passageway 68. The fitting 69 is internally threaded for the reception of a valve stem 70, the inner end of the latter being provided with a tapering head 71 adapted to be normally engaged with a seat 72 formed in connection with the walls of the passageway 68. The stem 70 passes through a packing 73 provided in the fitting 69 and is externally equipped with a manipulative knob or wheel 74.

Operation

The lower valve member 42, which is directly connected with the lower diaphragm member 51, is held in an open position by the application of the pressure of the fluid in the outlet side of the valve pushing in a downward direction on the diaphragm member 51. The lower valve member 42 will reach a position of closure, that is, in engagement with the seat 8, when the mechanical force of the adjustable spring 57 exceeds the pressure force supplied in a downward direction by the outlet fluid and on the diaphragm 51. It is evident, therefore, that said lower valve member will remain in an open position at any pressure above that for which the spring 57 is adjusted. It is also obvious that once the mechanical force of the spring has been adjusted to a desired value, the lower valve 42 will come to a closed position when the pressure force of the fluid on the diaphragm 51 is less than that of the mechanical force exerted by the spring 57.

Since the lower diaphragm chamber 52 communicates with the outlet chamber 5 through the passage 61 when the valve 66 is positioned to close the passageway 62, the outlet pressure, therefore, is the operating pressure applied on the top of the lower diaphragm. The valve 66 is maintained in a closed position at all times except when the valve proper is being placed in operation, either directly after the valve installation is made or after the lower valve member 42 has been closed automatically as a result of a sub-normal pressure condition on the outlet side of the main valve.

The upper valve member 25, which is directly connected to the upper diaphragm 18, is held in an open position by the application of an inlet pressure force applied in an upward direction on the under surface of the diaphragm 18. It will be noted that the inlet pressure is transmitted into the upper diaphragm chamber 14 through the drilled passage 35, the latter being so located as to establish communication between the inlet chamber 4 and said upper diaphragm chamber. Inlet pressure, therefore, applied in an upward direction and acting as a pressure force on the under side of the top diaphragm 18 maintains the top valve member 25 in its open position, spaced from the seat 7.

The mechanical force of the spring 31 at the top of the valve assembly furnishes the means for bringing the top valve member 25 to a position of closure. Said top valve member will remain in a wide open position when the fluid pressure on the under side of the diaphragm 18 exceeds the mechanical force of the spring 31. It is also clear that the top valve member 25 can be made to close at any predetermined pressure setting by adjusting the spring 31 to accomplish closure of said valve within a predetermined pressure range. On exceptionally high pressure lines, it will be understood that conventional lever and weight control mechanism may be substituted for the diaphragm springs.

The starting valve 66 in the valve fitting 63 is employed as a means for placing the top valve member 25 in service when pressure exists on the outlet side 5 of the valve and when no pressure exists on the inlet side 4 of the valve. The valve 66 when opened provides for fluid flow from the outlet chamber 5 through the passageway 16 into the upper diaphragm chamber, thus elevating the top valve member 25. Likewise, the starting valve 71, when opened by a definite manual operation, enables fluid to flow from the inlet chamber 4 into the lower diaphragm chamber 52, thereby moving the lower valve member 42 to its open position. When the valve members 25 and 42 have thus been opened to reestablish normal operation, the by-passing valves 66 and 71 are closed. The passageways 62 and 68 possess approximately four times the diameter of the open passages 35 and 61, permitting an inflow of fluid at a greater rate into the diaphragm chambers than the limited outflow which can take place through the more restricted passages, thus producing a sufficient pressure increase within the diaphragm chambers to flex the diaphragms against their spring resistances.

In view of the foregoing, it will be seen that the present invention provides a self-closing valve, operative in either direction of fluid flow therethrough, to effect a valve closure and cause complete stoppage of fluid flow in either normal or reverse directions when pressure on the upstream or downstream side of the valve falls to a danger point or to a predetermined pressure setting. The valve remains open to permit unobstructed fluid flow in either direction under normal or approximately normal pressure conditions. The valve mechanism described herein is particularly applicable in installations involving a network of interconnected gas mains, wherein the gas mains are fed from a plurality of supply sources. Under such conditions, one source of supply may fail to maintain normal pressures and, therefore, since gas is supplied by the remaining stations, a reversal in the direction of fluid flow will take place in the pipe lines contiguous to the source of gas supply in which the pressure has failed. There are, of course, numerous other practical applications in which the present valve mechanism may be usefully embodied.

We claim:

Self-closing valve mechanism comprising a casing, a divisional wall within said casing dividing the latter internally into fluid inlet and outlet chambers, there being an opening in said wall providing for fluid flow between the chambers, a flexible diaphragm mounted for limited movement within a diaphragm chamber formed in said casing above said opening, a valve member carried by said diaphragm adapted to seat on the upper side of said wall to close said opening against fluid flow, positively acting mechanical means tending to flex said diaphragm and maintain the valve member carried thereby in a position of opening closure, a second diaphragm chamber formed in said casing below said inlet and outlet chambers, a second diaphragm mounted for limited movement in said second diaphragm chamber, a second valve member carried by said second diaphragm, positively acting means operating on one side of said second diaphragm and tending to flex the latter sufficiently to maintain the second valve member carried thereby in fluid flow arresting engagement with said opening, a restricted passage for conducting fluid under pressure from said inlet chamber to the lower part of said first-named diaphragm chamber, a second restricted passageway for conducting fluid under pressure from said outlet chamber to the upper part of said second diaphragm chamber, a third passageway extending from said outlet chamber to the under side of the first-named diaphragm chamber, a fourth passageway extending from said inlet chamber to the upper side of the lower diaphragm chamber, and manually operated valves for normally arresting fluid flow through the third and fourth passageways, said third and fourth passageways being each greater in diameter throughout the lengths thereof than the first and second passageways.

WILLIAM LEWIS LYON.
MILTON E. LAKE.